(12) United States Patent
Volpato et al.

(10) Patent No.: US 11,034,812 B2
(45) Date of Patent: Jun. 15, 2021

(54) APPARATUS FOR DISPERSING A GAS, FOR EXAMPLE CARBON DIOXIDE, IN AT LEAST ONE REACTIVE RESIN

(71) Applicant: AFROS S.P.A., Caronno Pertusella (IT)

(72) Inventors: Marco Volpato, Caronno Pertusella (IT); Maurizio Corti, Como (IT)

(73) Assignee: AFROS S.P.A., Caronno Pertusella (IT)

( * ) Notice: Subject to any disclaimer, the term of this patent is extended or adjusted under 35 U.S.C. 154(b) by 250 days.

(21) Appl. No.: 16/019,929

(22) Filed: Jun. 27, 2018

(65) Prior Publication Data

US 2019/0002661 A1 Jan. 3, 2019

(30) Foreign Application Priority Data

Jun. 30, 2017 (EP) .................................. 17178969

(51) Int. Cl.
*B29B 7/00* (2006.01)
*C08J 9/12* (2006.01)
(Continued)

(52) U.S. Cl.
CPC ........... *C08J 9/122* (2013.01); *B01F 3/04446* (2013.01); *B01F 13/0211* (2013.01); *B01J 3/008* (2013.01);
(Continued)

(58) Field of Classification Search
CPC ............................. B01F 3/0446; B01F 3/0211
See application file for complete search history.

(56) References Cited

U.S. PATENT DOCUMENTS

| 6,280,692 B1 | 8/2001 | Bartlett |
| 2015/0232629 A1 | 8/2015 | Lindner et al. |
| 2016/0333160 A1 | 11/2016 | Bertucelli et al. |

FOREIGN PATENT DOCUMENTS

| DE | 28 25 230 A1 | 12/1979 |
| EP | 0 353 061 A2 | 1/1990 |

OTHER PUBLICATIONS

Machine Translation of DE2825230A to Steger, the original document was published Dec. 20, 1979. Translation was retrieved Jul. 29, 2020. (Year: 2020).*

(Continued)

*Primary Examiner* — Anshu Bhatia
(74) *Attorney, Agent, or Firm* — Hickman Becker Bingham Ledesma LLP; Malgorzata A. Kulczycka

(57) ABSTRACT

The invention concerns an apparatus (1) for the dispersion of an expansion gas even in supercritical conditions, e.g. carbon dioxide, in a reactive resin, of the kind in which a reaction chamber having an input (27) for gas and an input (37) for resin is provided. Advantageously, the chamber is a dispersion and containment chamber made into a casing (2) of predetermined high resistance susceptible to sustain high pressure and is divided into two sections (6,7) by a head (14) of a dispersion and mixing cylinder-piston group (4) in fluid communication between themselves by means of at least one pouring passage (31, 36, 32, 39) provided with a static mixer (38), motor means (3) being provided for piston (34) control of said mixing cylinder-piston group (4). The invention also concerns a process for the formation of a polyurethane foam starting with the dispersion of carbon dioxide, even supercritical, in a reactive resin in which at least one initial dispersion and mixing controlled phase of the two components is provided in a dispersion and containment chamber under pressure divided into two sections (6,7) by a head (14) of a cylinder-piston mixing group (4) in fluid communica- (Continued)

tion between themselves by means of at least one pouring passage (31, 36, 32, 39) provided with a static mixer (38) and in which adduction, dispersion and mixing occurs under high pressure (at least greater than 75 bar).

12 Claims, 9 Drawing Sheets

(51) Int. Cl.

| | | |
|---|---|---|
| *B29B 7/74* | (2006.01) | |
| *B29C 44/34* | (2006.01) | |
| *B01F 3/04* | (2006.01) | |
| *B01F 13/02* | (2006.01) | |
| *B01J 3/00* | (2006.01) | |
| *B01J 19/18* | (2006.01) | |
| *C08G 18/42* | (2006.01) | |
| *B29K 75/00* | (2006.01) | |
| *C08G 101/00* | (2006.01) | |

(52) U.S. Cl.
CPC .............. *B01J 19/18* (2013.01); *B29B 7/7409* (2013.01); *B29B 7/7419* (2013.01); *B29B 7/7428* (2013.01); *B29B 7/7433* (2013.01); *B29C 44/3442* (2013.01); *C08G 18/4247* (2013.01); *B01F 2215/0049* (2013.01); *B01F 2215/0468* (2013.01); *B29K 2075/00* (2013.01); *C08G 2101/00* (2013.01); *C08J 2201/022* (2013.01); *C08J 2203/08* (2013.01); *C08J 2205/044* (2013.01); *C08J 2375/04* (2013.01)

(56) References Cited

OTHER PUBLICATIONS

European Search Report in application No. EP 17 17 8969, dated Jan. 5, 2018, 2 pages.

\* cited by examiner

APPARATUS FOR DISPERSING A GAS, FOR EXAMPLE CARBON DIOXIDE, IN AT LEAST ONE REACTIVE RESIN

This application claims the benefit under 35 U.S.C. § 119 of European Patent Office (EPO) application 17178969.6, filed Jun. 30, 2017, the entire contents of which are hereby incorporated by reference for all purposes as if fully set forth herein.

DESCRIPTION

The present invention concerns an improved apparatus for performing dispersion of a gas, for example, carbon dioxide, in at least one reactive resin, of the kind in which a mixing chamber having a supply input for the gas and a supply input for the resin is provided for.

The invention also concerns a process for obtaining a resin-gas mixture by means of the afore mentioned apparatus and for subsequently dosing the resin-gas mixture maintaining the dispersion in order to obtain a polyurethane foam.

More in particular, but not exclusively, the invention concerns a system and a process for the formation of a polyurethane foam starting from the dispersion of a gas, e.g. carbon dioxide, in a reactive resin with at least one initial mixing phase of the two components in order to form an intermediate resin-gas mixture as the first component of a final chemical reaction and to subsequently dose this first reacting component in a mixing system with at least a second reagent in order to form a polyurethane foam; the following description is carried out referring to this specific field of application with the sole goal of simplifying the exposition.

FIELD OF APPLICATION

In order to understand all the aspects of the present invention better it is first of all suitable to list a few aspects of the chemical reactions that intervene when gas in the expansion phase meats a reactive resin.

For example, carbon dioxide ($CO_2$) is a chemical substance that, in the shape of expansion gas, may expand a reactive resin completely or partially in order to form a polyurethane foam during expansion and polymerization.

Concerning this it is pointed out that normally a polyurethane foam is formed and polymerized by means of a chemical reaction between two reagent resins: e.g. polyol and isocyanate. Polyol is first of all combined with an expansion agent, for example, dispersed in the polyol which develops gas during the reaction phase when the two resins are appropriately mixed, or with a certain amount of water that, reacting with a part of the isocyanate, produces $CO_2$ of chemical origin and urea, originating the foam's expansion.

$CO_2$ of chemical origin is developed during the polymer's embroiling phase, normally in shape of rising gas microbubbles that are than enriched by further gas swelling until the polyurethane foam is formed.

In certain formulations $CO_2$ of chemical origin is the only gas that exerts expansion. In other formulations, on the other hand, another expansion agent is added to the polyol dispersing it therein. For example, processes are known that employ a Freon, a Hydrocarbon or a Hydrofluoroolefin or a mixture of these chemical elements, with a boiling temperature at environmental pressure comprised between −30° C., up to 60° C.

These gaseous expansion agents exert the function of physical expanders, alongside with water which in reaction with isocyanate produces the chemical $CO_2$. These gaseous agents are freed during the reaction, both because of the increase of the reactive resin temperature, and because of the reduction of solubility in the polymer during the progressive elongation and embroilment.

These gaseous agents, however, even if very effective in foam formation, have such characteristics that make them, once freed, able to cause ozone damage and/or a greenhouse effect which are even greater than those caused by carbon dioxide.

PRIOR ART

In the last few years the use of adding physical $CO_2$ has become widespread, dissolved in polyol, which allows to obtain the formation of microbubbles and then bubbles that allow to form the cells of a polyurethane foam.

This way it is possible to avoid creating and then inserting $CO_2$ that does not derive from already renewed sources (for example derived from chemical reactions) into the atmosphere and to avoid using part of the isocyanate as a reagent that then forms undesired urea in the foam.

This expedient allows to save the cost of the share of isocyanate which is destined, in reaction with water, to form $CO_2$ and to avoid releasing urea molecules that make it less flexible and deteriorate some mechanical properties into the foam. Added to that, a process that does not damage the global atmospheric environment is employed.

The known technique teaches that it is possible to carry out polyurethane foam expansion with physical $CO_2$ for the formation of both rigid foam and flexible foam. Flexible polyurethane foam is characterized by having open cells i.e. lacking or partially lacking closing membranes that separate one cell from the other, while rigid foam is formed by cells with closed separation membranes. The addition of physical $CO_2$ (of atmospheric origin) reduces the share of chemical origin and contributes to improving the mechanical elastomeric properties of the flexible foam at the same density and to reducing costs.

Despite these advantages the current technique provides for liquid $CO_2$ dispersion or gaseous $CO_2$ absorption in limited quantities of less than 2% of the polyol weight, or of less than 3% in isocyanate.

In the rigid polyurethane foam, characterized by closed cells that are separated by membranes and that trap the gasses that originate the same cells, the $CO_2$ of physical origin, pre-dispersed in the reactive resin, allows to reduce the average size of the cells this way improving the thermic insulation coefficient of the foam.

The technology that applies $CO_2$ as a physical expansion agent in the rigid foam is currently in the evolution phase and has not yet found valid application modalities and industrial diffusion, even if it would have great potential in making rigid foam that can be employed e.g. for thermic insulation.

What may be more interesting for industrial application is the employment of so called supercritical $CO_2$ which has a density, as a supercritical gas, that does not distance itself much from the density of the liquid phase at the considered temperature and pressure, but is characterized by very polar molecules, of reduced sizes and moveable relative to the polymeric molecules, which, in supercritical pressure and temperature conditions, very easily connect to the polymeric chains also forming a type of dispersion and absorption with a gelatinous solution (sol-gel). This gelatinous solution, during the reaction phase with isocyanate, in particular during the decrease of the pressure which the reactive liquid is exposed to, does not immediately free the $CO_2$ gas, but slowly releases it thus originating very minute microbubbles which make foam with very small cells.

The use of dispersed $CO_2$ in supercritical conditions in reactive resins would thus allow consistent benefits for the environment and would allow e.g. obtaining coatings for refrigerator containers dedicated to the cold chain thermally insulated in a very effective way allowing to reduce energy consumption of the latter and to fulfill the more and more stringent environmental protection regulations that respond to the directives of the Montreal, Tokyo and Paris protocols, on the use and emission of greenhouse effect gasses into the atmosphere.

It is favorable to mention that $CO_2$ is a gas that liquifies when suitably compressed below the critical temperature of 31° C. Above this temperature it does not present anymore liquid phases but turns in to a strongly thickened gas, which, at the critical temperature of 31° C., substantially has the same density of the liquid.

Therefore at the equivalent balance pressure, rising above 31° Celsius, the $CO_2$ passes from a liquified gas under pressure condition to a compressed gas condition without a significant increase of the pressure in the container that contains it.

As is known, $CO_2$ is a highly polar molecule and this polarity conditions its afore mentioned physical characteristics and makes it easily soluble both in water and in several organic substances.

These $CO_2$ peculiarities make the properties that allow it to be dispersed in a molecular solution in a polyurethane resin both in the liquid phase and above the critical temperature interesting.

The known technique already teaches how to disperse liquid $CO_2$ in a reactive resin using qualified tanks for the containment of the resin and gas mixture (a so-called blend) and with pressures that are normally limited to 10-12 bar, i.e. pressures for which the tanks available in the current industrial systems for dosing reactive resins are qualified.

What is proven though is that using these tanks and these pressures, for example without exceeding 10 or 12 bar, the solubility of $CO_2$ in resin is modest and very slow.

Complete absorption requires several hours, even up to 12-20 hours, which become necessary to establish the condition of balance between dissolved percentage and partial pressure in the tank. For example, around 2% of the $CO_2$ mass may disperse maintaining a $CO_2$ pressure in the internal atmosphere of the tank between 6 and 10 bars for hours.

Wanting to insert a higher quantity, e.g. using static mixers or by means of mechanical agitation, the $CO_2$ does not dissolve in higher amounts in the resin, but is freed as a vapor and increases the pressure in the container until it reaches a balance with the container's atmosphere. In any case, even in certain experimental applications it is not possible to effectively disperse $CO_2$ amounts that are higher than 5% even using qualified tanks up to 30 or 40 bar.

Yet it is to be mentioned that in the supercritical conditions described before, in which the $CO_2$ is found or exceeds the critical temperature of 31° C., the initial dispersion balance pressure tends to be higher than 75-76 bar. Therefore, if one does not proceed very slowly during dispersion, even in the presence of mechanical agitators, with minimal quantities of $CO_2$ (for example around 1%-2%/hour) and on the other hand forces the amount of inserted $CO_2$, it is possible to generate such pressures in the tank that accumulates the resin as to open the safety valves that discharge gaseous compounds and bring back the internal pressure to balance and protection conditions in the tank.

It therefore proves itself to be very difficult and costly in terms of time and tank characteristics to obtain a dispersion of a certain quantity of $CO_2$ (higher than 3-4%) within a resin using a simple dispersion mechanism and without operating at much higher pressures than the critical one. In addition to this it is also necessary to consider the cost of the tank and the relative accessories suited to supporting more elevated pressures.

With the current industrial processes it is not possible to effectively and efficiently obtain a dispersion of a predetermined quantity of $CO_2$ (at least higher than 3-5% of the weight) within a reactive resin using the simple dispersion mechanism within tanks with free space and air due to the presence of the gas phase.

The technical problem that is at the basis of this invention is that of devising an apparatus and a relative process, having respective structural and functional characteristics, such as to allow to efficiently disperse a gas, for example carbon dioxide, in a reactive resin in relatively short times using essentially mechanical dispersion but obtaining gas dispersion percentages in the resin that are much higher than what is currently made possible by the solutions offered by the known technique.

Another aim of the present invention is that of combining the apparatus and the dispersion process with the dosed emission one of the resin-gas blend in order to obtain a polyurethane foam formation system that is compact, efficient and cheap in the scope of a process that is equally efficient and rational.

Another aim of the present invention is that of obtaining a dispersion and absorption phase of the gas in the reactive resin and a subsequent expansion and polymerization phase that may occur by means of simple adjustment of the process parameters in terms of temperature and pressure.

A further aim of the invention is that of obtaining a polyurethane foam with a dominance of very fine structure cells with average diameter sizes lower than e.g. 80 micrometers.

SUMMARY OF THE INVENTION

The solution idea at the basis of the present invention is that of resorting to a combined mixing and dosing apparatus, provided with a casing having a containment structure with materials and thickness that are sufficient to operate at a prefixed elevated pressure value, greater than e.g. 75-76 bar and up to 350 bar, and of providing a regulated dosage of reactive resin and expansion gas insertion in order to obtain a resin-gas mixture which is maintained and subsequently dosed at a high pressure for a further mixing and polymerization phase with another reactive resin in order to yield a polyurethane foam.

A first embodiment of the present invention comprises an apparatus for the dispersion and mixing of an expansion gas, e.g. carbon dioxide, in a reactive resin, comprising:

a mixing chamber having a supply input for the gas and
        a supply input for the resin is provided and comprising:
        said chamber being a dispersion and containment chamber made in a casing of predetermined high resistance susceptible to sustain high pressure;
        said chamber being divided into two sections by a head of a dispersion and mixing cylinder-piston group, said two sections being in fluid communication between themselves by means of at least one pouring passage;

a static mixer in said pouring passage;

a motor for said piston to control the movement of said mixing cylinder-piston group.

Advantageously, the invention provides for an unusually efficient mechanical dispersion of the gas in the resin maintained in so called supercritical conditions, i.e. with high pressures and prefixed temperature adjusting the dosage in mass ratio of the reactive resin with the gas dispersed therein.

It furthermore provides for using the same containment and dispersion apparatus for dosing the reactive intermediate resin-gas mixture thus obtained and maintained at a final mixing system with another reactive resin in high pressure.

In a preferred embodiment, the afore mentioned high pressures are greater than at least 75-76 bar at a temperature of at least 31° Celsius. More in particular these pressures are preferably comprised between 100 and 350 bar.

In other words, on the basis of the afore mentioned solution idea, the technical problem is resolved by the dispersion of a gas, e.g. carbon dioxide, in a reactive resin of the kind in which a mixing chamber having a gas input and a resin input is provided, wherein said chamber is a dispersion and containment chamber which is made in a casing of predetermined high resistance susceptible to sustain high pressure and is divided into two sections by a head of a dispersion and mixing cylinder-piston group in fluid communication between themselves by means of at least one pouring passage provided with a static mixer, motor means being provided for piston control of said mixing cylinder-piston group.

Said pouring passage is made into the head intercepted by valve means in order to put in communication the two sections of the dispersion and containment chamber under pressure and in order for said gas and resin inputs to flow into a section of said chamber.

Advantageously, said gas is carbon dioxide maintained in supercritical temperature and pressure conditions.

The separation of the two chambers allows for controlled dosage of the blend formed by the resin-gas mixture.

Advantageously, the containment walls of said dispersion and mixing cylinder-piston group form a casing of elevated thickness and with characteristics that are suited to support and maintain elevated pressure operative conditions. The dosage phase of resin and gas dispersed therein occurs by always maintaining pressure conditions of the mixture above 100 bar. In particular comprised between at least 75-76 bar (supercritical CO2 pressure at a temperature of 31 degrees) and 350 bar.

It is to be noted that the afore mentioned pouring passage is made into the head of said cylinder-piston group and comprises at least one cylindrical housing in which at least one static mixing section is inserted. As an illustrative, but not limiting example, these sections comprise at least one grid or plate with a plurality of holes.

Furthermore, the control means become concrete in an oleodynamic commanding cylinder, powered by an oleodynamic circuit dependent on a hydraulic unit controlled by a programmable controller; said control cylinder having a piston with a rod in common with the piston rod of the dispersion and mixing cylinder-piston group.

The dispersion and mixing cylinder-piston group further comprises a piston rod, having the same section of the control rod, connected to said head and cantilever extended outside the mixing and dosing cylinder through a shutting flange.

Also provided are valve means for mechanical controlled interception along the afore mentioned fluid passage; a command shaft of said valve means being housed in a groove obtained inside said rod cantilever extended outside the cylinder.

A position transducer is associated with the piston of the control cylinder to send a feedback signal to said hydraulic unit.

2. The invention also concerns a process for the formation of polyurethane foam starting from the dispersion of an expansion gas, e.g. carbon dioxide, in a reactive resin; the process including:

at least one initial dispersion and mixing phase of the two components in order to form an intermediate resin-gas mixture as a first reactive component of a final chemical reaction;

a subsequent dosing phase of said first reactive component in a mixing and reaction plant with at least a second reactive component in order to form polyurethane foam; and wherein a controlled dispersion and mixture of the said two components is provided in a dispersion and containment chamber kept under pressure and divided into two sections by a head of a cylinder-piston mixing group; said two sections being in fluid communication between themselves by means of a pouring passage provided with a static mixer and in which adduction, dispersion and mixing occurs at high pressure.

An interception valve is also inserted into said pouring passage.

The process according to the invention provides for a first phase in which the chamber is filled with gas and resin in the desired mass ratio up to a maximum of 40% of gas (CO2) and up until the achievement of a predetermined desired pressure. A subsequent dispersion and mixing of the gas in the resin until the achievement of the necessary dispersion and absorption and a third phase in which said reactive mixture, with the component parts dispersed and absorbed, is dosed with precision in pressure and range toward a high pressure mixing head and anyway at a pressure greater than 75-76 bar.

The resin-gas mixture that is thus sent to a mixing head with pressures that are greater than 75 bar, preferably comprised between 100 and 350 bar, is first recirculated through the aforementioned head of the dosage chamber to another chamber of the dispersion cylinder in order to exactly set the range of the resin supplemented with the gas and then mixed at a high pressure with the other reactive resin, in particular isocyanate, dosed in a mass stoichiometric ratio by the system, in order to create a polyurethane foam.

The characteristics and advantages of the apparatus, the process and the system according to the invention will become apparent from the following description of an embodiment thereof given as an example not a limitation with reference to the accompanying drawings.

DETAILED DESCRIPTION

Figure 1:
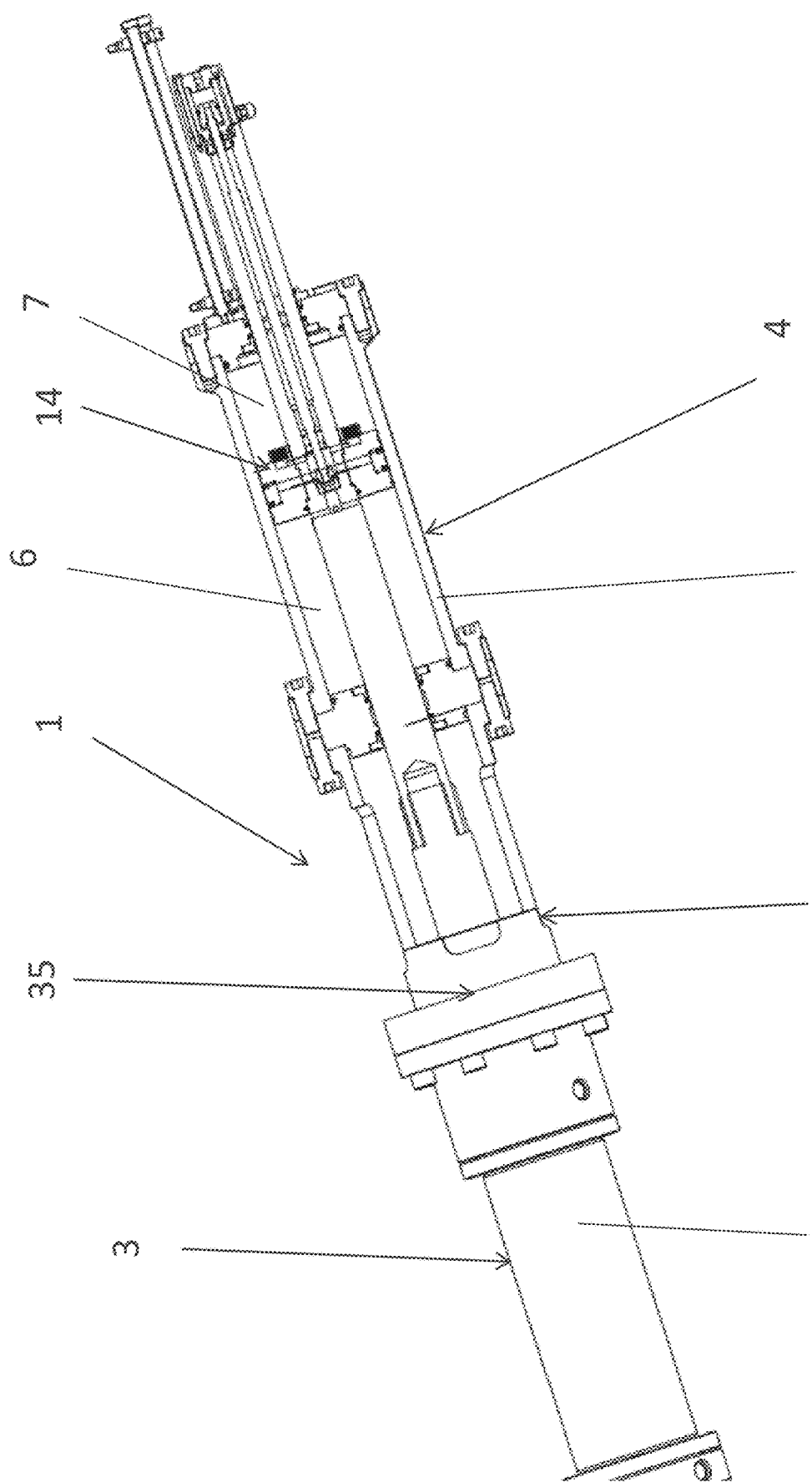
FIG. 1 shows a schematic and assonometric view, in partial longitudinal section, of the apparatus made according to the present invention for the dispersion and mixing of a gas, e.g. carbon dioxide, in a reactive resin.

With regard to the drawings, reference numeral 1 globally and schematically illustrates an improved apparatus realized according to the present invention in order to facilitate dispersion under elevated pressure of a gas or a liquefiable gas in a reactive resin in order to obtain a polyurethane foam.

The gas to be dispersed may be e.g. carbon dioxide, but other types of gas may also be used without this having to represent a limitation of the Applicant's rights. Still as a pure example it is pointed out that a Freon, a Hydrocarbon or a Hydrofluoroolefin or a mixture of these chemical elements may be used as a gas to be dispersed.

Analogously, the reactive resin may be an isocyanate or a mixture of polyol and isocyanate without this necessarily representing a limit to the Applicant's rights.

Advantageously, according to the invention, the apparatus 1 comprises at least one dispersion and dosing cylinder 4 whose double stadium structure will be described in detail below.

The cylinder 4 of said apparatus 1 has an external casing of predetermined elevated thickness in order to constitute a container that is susceptible to operating safely at high internal pressure. The casing 2 is furthermore made out of a metallic material of adequate thickness such as to support internal pressure that is higher than at least 350 bar.

In other words, according to the present invention, the apparatus 1 is structured with external walls and other elements of pressure support of enhanced thickness and with a metallic material of adequate resistance in comparison with conventional type cylinders.

More in particular, cylinder 4 of apparatus 1 is able to support internal pressure up to 350 bar.

Even more in particular, apparatus 1 comprises a first hydraulic and oleodynamic cylinder 3 and the dispersing and dosing cylinder 4 that was already mentioned. These two cylinders 3 and 4 are associated by axial alignment.

We may define the first hydraulic cylinder 3 as a control cylinder and the other dispersion and dosing cylinder 4 as a dispersion and mixing cylinder.

The control cylinder 3 is substantially a conventional structure cylinder with an outer casing 5 of adequate thickness and an end portion that allows it to be coupled with the other dispersion and mixing cylinder 4. It is not strictly necessary for the casing 5 of the control cylinder to have the same elevated thickness of the casing 2 of the mixing cylinder, but at the same time nothing prohibits that it can have the same thickness.

More in particular, flange coupling 35 is provided in order to connect the two cylinders 3 and 4. Furthermore at the coupling 35, on the side of the dispersion and mixing cylinder 4, a spacer separator bell 40 is provided.

Substantially, in the configuration illustrated before, the control cylinder 3 may be a commercial hydraulic cylinder suited to managing the forces developed by cylinder 4 during operation.

Figure 2:
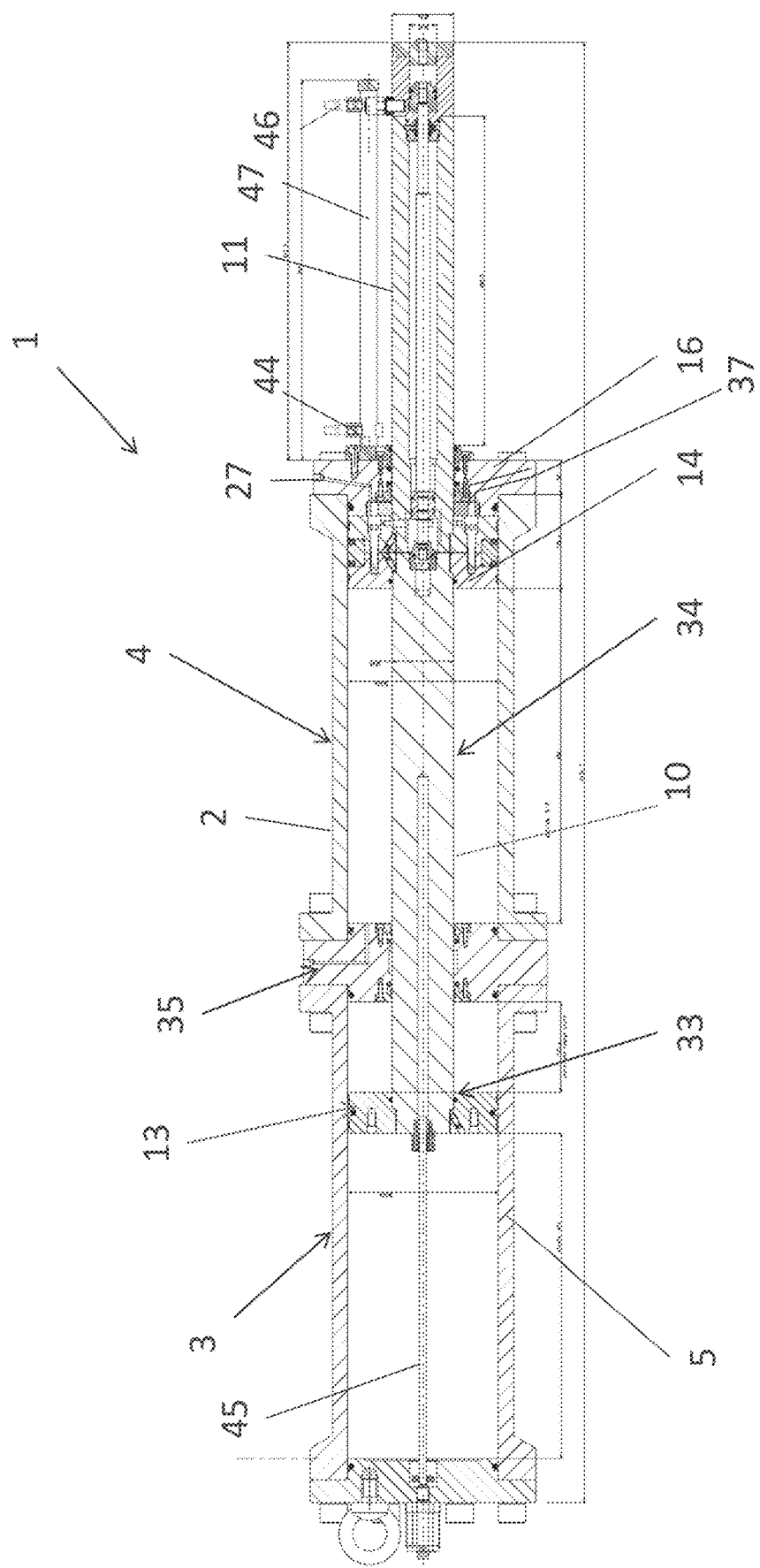
FIG. 2 shows a schematic view in longitudinal section of the apparatus of FIG. 1.

The overall structure of the cylinders 3 and 4 is shown in the section view of FIG. 2 whereas the internal structure of just the dispersion and mixing cylinder is shown in the assonometric section of FIG. 1.

Figure 3:
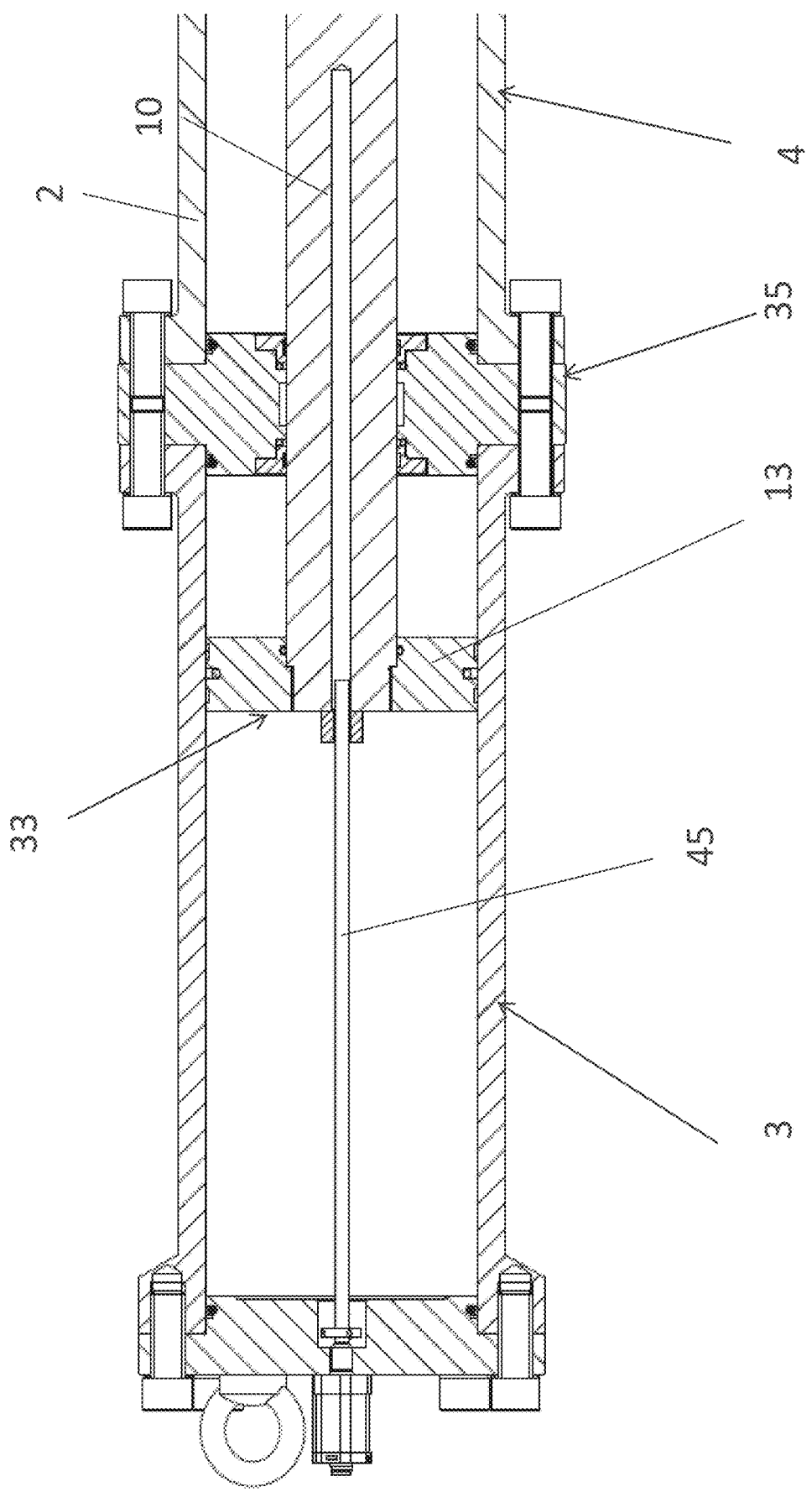
FIG. 3 shows a view in longitudinal section of a command hydraulic cylinder piston group of the apparatus of FIG. 1.
Figure 9:
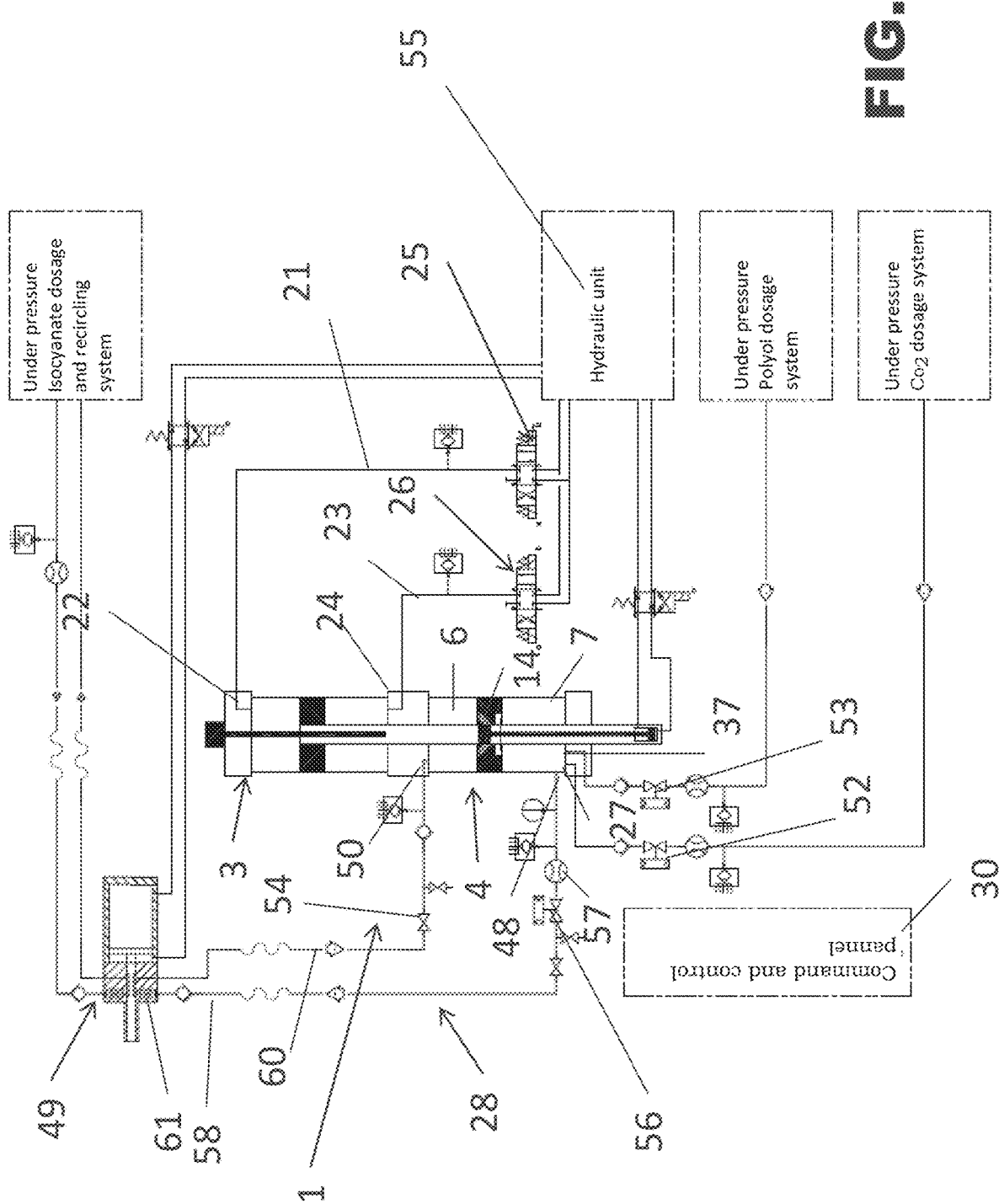
FIG. 9 shows a schematic view of a system incorporating the apparatus of FIG. 1 for the activation of a process according to the invention.

As shown in FIG. 3, the first hydraulic cylinder 3 is a double acting cylinder, powered with hydraulic fluid under the control of a hydraulic unit 55 having command and control functions, said unit 55 is illustrated in FIG. 9.

The aforementioned cylinder 3 is particularly compact and internally comprises a position transducer 45 in order to precisely detect the movement of the relative piston 33. The movement of the hydraulic cylinder 3, or better of the head 13 of the piston 33 slideable therein, is dependent on the aforementioned hydraulic unit 55 which is also active in regard to the movement and pressure of the dispersion and mixing cylinder 4.

The dispersion and mixing cylinder 4 may also be defined as a blender cylinder.

The aforementioned dispersion and mixing cylinder 4 comprises two opposed sections 6 and 7, having equal and respective thrust sections. The aforementioned sections 6 and 7 are separated by a head 14 of a piston 34 which is slideable in the cylinder 4.

In other words, it is as if in the cylinder 4 there were a containment and mixing chamber yet divided into two sections 6 and 7 of the head 14 of the cylinder-piston group; said sections 6, 7 are in fluid communication between each other by means of at least one pouring passage provided with a static mixer 38. A technician of the sector may appreciate the fact that the two sections 6 and 7 may be in communication between each other by means of a passage that is external to cylinder 4; however, this alternative solution, even if practicable, involves greater structural burdens.

Each of the aforementioned thrust sections 6 and 7 is destined to the dispersion and dosage of a mixture, so called blend, of resin and gas. In the exemplary embodiment described here in an indicative and non limiting manner the aforementioned mixture comprises a reactive resin e.g. polyol and carbon dioxide (CO2).

A sleeve, not shown in the drawings, is also provided for, enveloping the two thrust sections in order to control the temperature of the mixture or blend.

Advantageously, according to the present invention, the respective pistons 33 and 34 of the cylinders 3 and 4 are connected by assial alignment.

In other words, the piston 33 of control cylinder 3 and the piston 34 of the dispersion and mixing cylinder 4 are connected in a direct and integral manner.

As has already been said, the motion of piston 33 of control cylinder 3 is detected by a position transducer 45 which is connected to a programmable process controller 30 in order to provide a feedback signal which allows to command the hydraulic fluid dispensed from said hydraulic unit 55 in a closed circuit by means of the servo valves 25 and 26 for the position and movement control of each of the pistons 33 and 34 connected rigidly in axial extension.

The dispersion and mixing cylinder 4 is equipped with a head 14 which is bound to two symmetrical and opposing rods 10 and 11 of the same section. Advantageously, the head 14 comprises a pair of semiheads 14a, 14b integrally connected with an interposition into the interior of the cylinder of some gaskets 9A with creaking seal and 9B with static seal.

It is to be noted that the two sections 6 and 7 of the dispersion and mixing cylinder 4 are in fluid communication by means of a fluid path P. Advantageously, the fluid path P, which puts the two sections 6 and 7 into communication, is made into the head 14. It is also to be noted that the fluid path P is intercepted by valve means 20A and 20B also made into the head 14 and constituting a sealing and intercepting valve.

At least one pouring passage is made into the head 14, defined said fluid path, intercepted by valve means 20A and 20B, which sets the two chambers 6 and 7 of the mixing and dosing cylinder 4 into fluid communication as well become apparent in the following detailed description.

The two semiheads 14a and 14b are structured such as to contain the valve elements 20A and 20B, the gaskets 9A and 9B, a pouring passage of the fluid being mixed and the connections of the control rods of the heads 14 and the internal organs in a synthetic and optimized way as well as to sustain the usage pressure for which the cylinder is predisposed.

One of these rods, the rod 10, connects the head 13 of the piston 33 of the hydraulic control cylinder 3 with the head 14 of the piston 34, in particular with the semihead 14a. In other words, the piston 33 inside of cylinder 3 has, for reasons of compactness, one rod 10, which extends and coincides with the rod of piston 34 in cylinder 4.

The other one of said rods, rod 11, is hollow and protrudes outside of the cylinder 4 through a sealing flange 16 of the basis of the same cylinder 4. The aforementioned external rod 11 has the same section of the other rod 10 connected to the head 14, in particular to the semihead 14b, in order to avoid section variations between the respective chambers 6,7 of the cylinders during the movement of piston 34 in order to transfer the mixture or blend without substantial volume change and therefore pressure when the resin contains dispersed gas.

Pouring carried out at constant volume allows to maintain the resin and gas mixture at the mixing and dispersion pressure that favors the gas absorption and dissolution in liquid. Absorption and dissolution make way for a reduction of the mixture's volume and therefore the pressure that can be restored by adding new quantities of gas until reaching the balance between pressure and absorbable amount.

Figure 4:
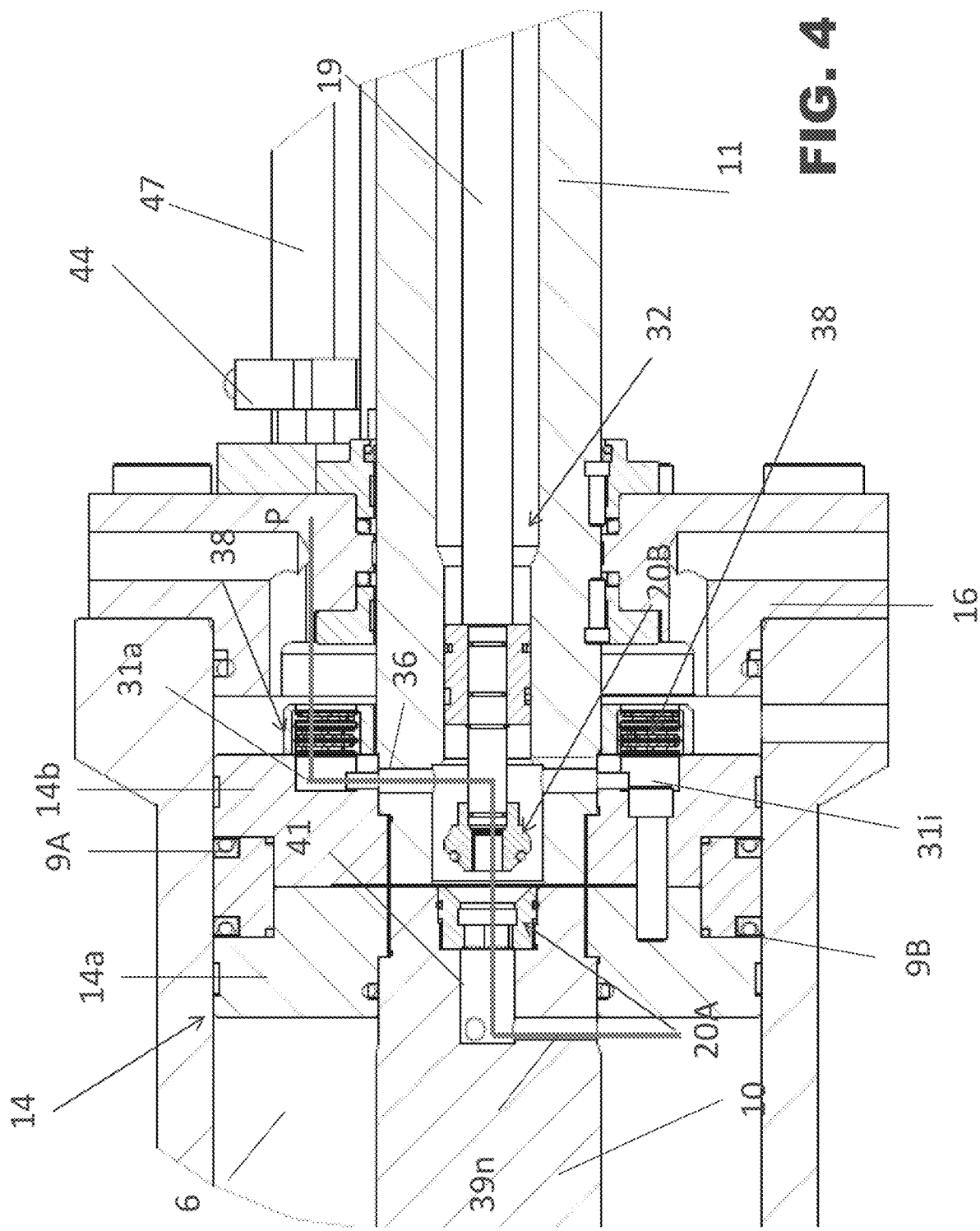
FIG. 4 shows a scale-enlargened schematic section view of a detail of the dispersion and mixture head incorporated into the apparatus according to the invention.

As has been said, and shown in FIG. 4, the head 14 of the piston 34 is structured internally with a plurality of passages 31a, . . . 31n which together form at least one pouring passage and allow the pouring of the resin and gas mixture between the chambers 6 and 7 of the dispersion and mixing cylinder 4. In FIG. 4 the fluid path that defines at least one pouring passage is indicated schematically by a line P with continuous segments.

In a preferred embodiment, the passages 31a, . . . 31n are regularly and annularly disposed in a prefixed distanced angular relation around the connection point between the rod 11 and the semihead 14B of the head 14. The number n may be chosen equal to twelve.

Figure 5:
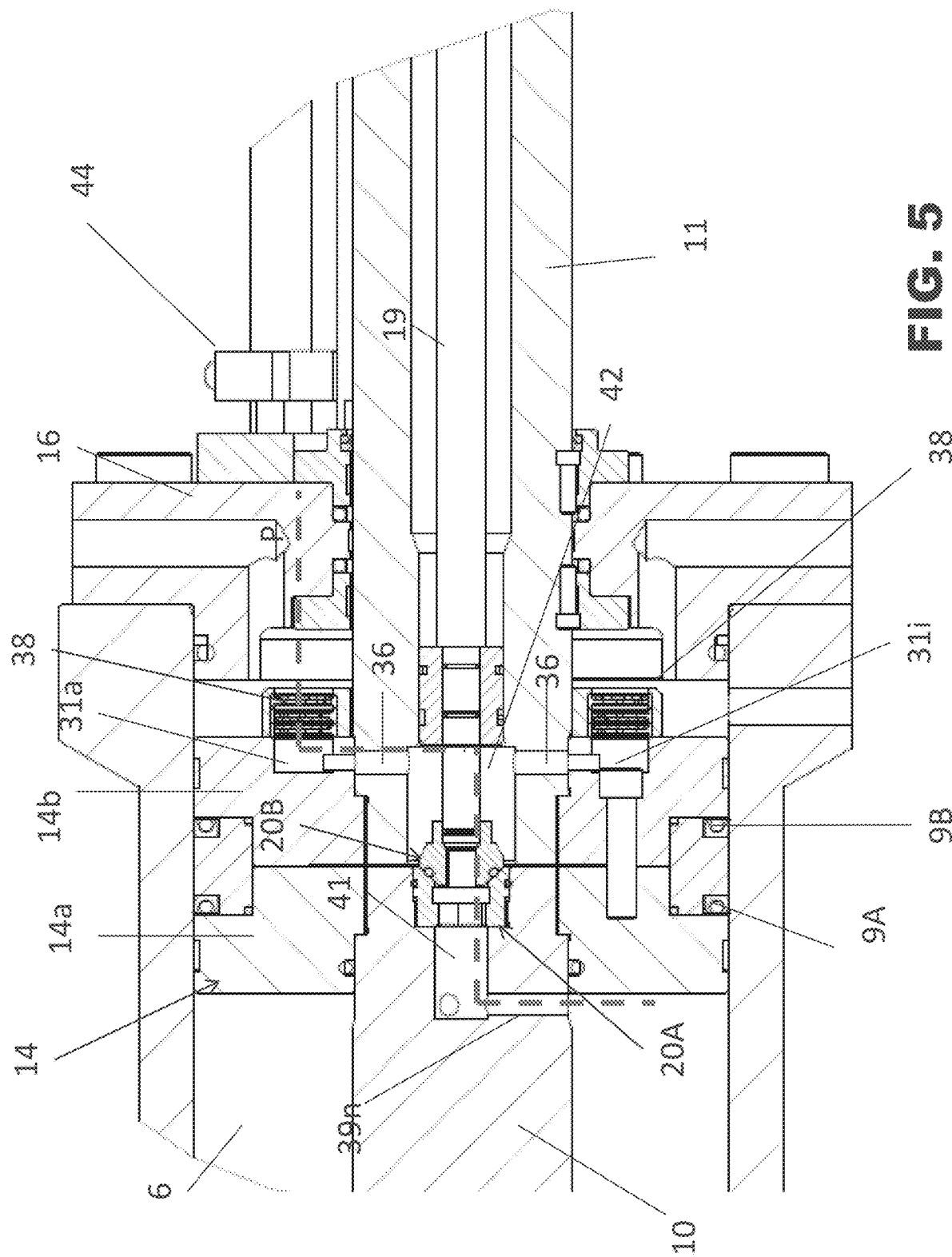
FIG. 5 shows an enlargened scale schematic section view of the detail of FIG. 4 in a different functioning condition.

As shown in FIG. 5, in particular at the far end of the semihead 14B each of these passages 31i is provided with cartridges 38 provided with grids or several pierced plates 18 arranged in series. The presence of these cartridges 38, by means of lamination and turbolence induced by the lamination through the holes in the plates or grids, favors remixing of the resin with the dispersed gas such as to favor rapid dissolution and absorption by means of molecular diffusion.

The grids or pierced plates 18 are preferably disposed in a parallel manner and distanced by a distancer located at their periphery. The plates 18 are interested by an equal plurality of holes but it is convenient for the grids and holes to be out-of-phase from one plate to the next in order to create greater turbolence and remixing.

In a preferred embodiment the aforementioned grids or pierced plates 18 are in groups of three and substantially form a cartridge that can be inserted as a pack into the corresponding cylindrical housing 31a, . . . , 31n.

Figure 6:
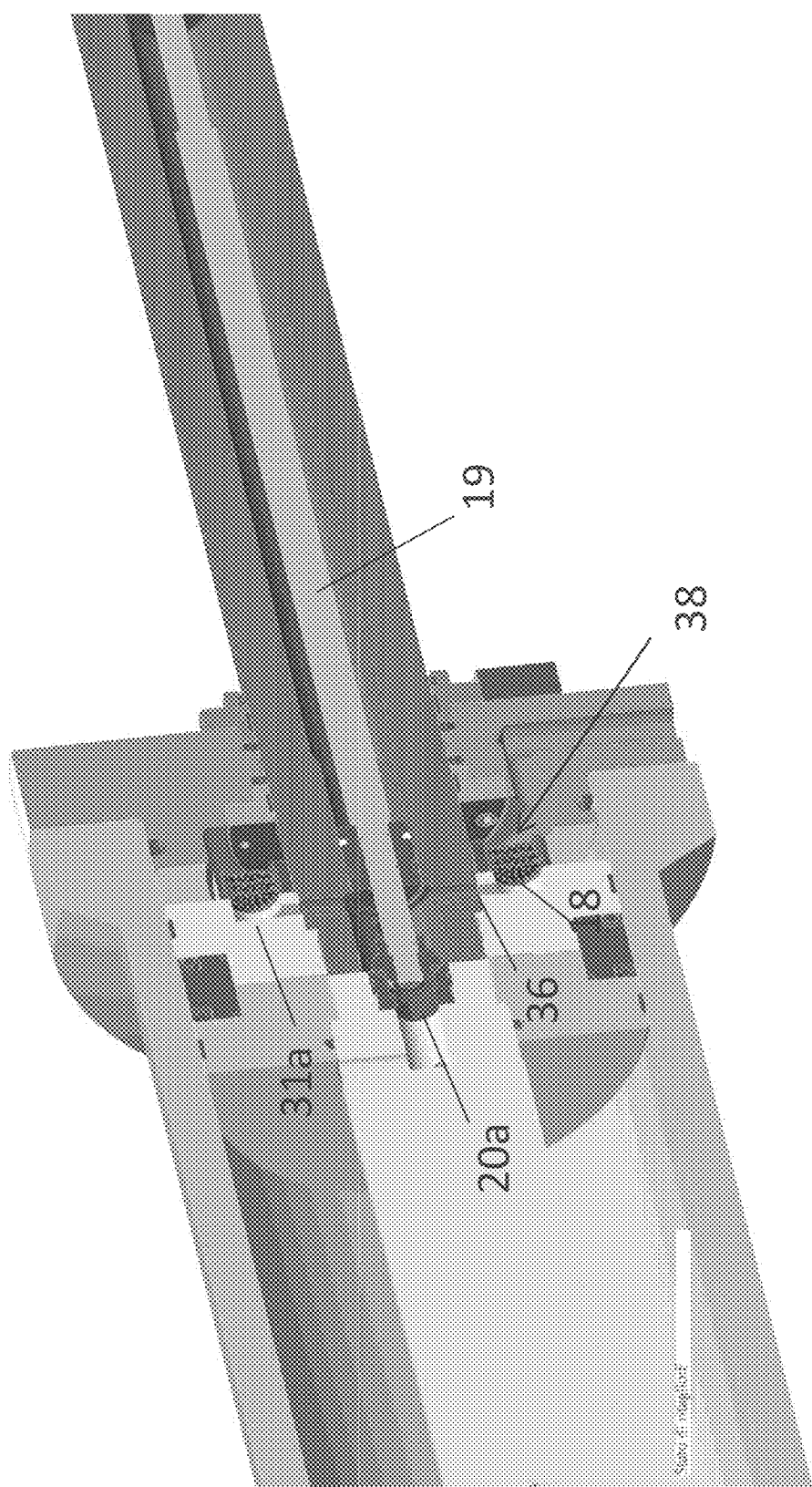
FIG. 6 shows a perspective and schematic view of the detail of FIG. 5.
Figure 7:
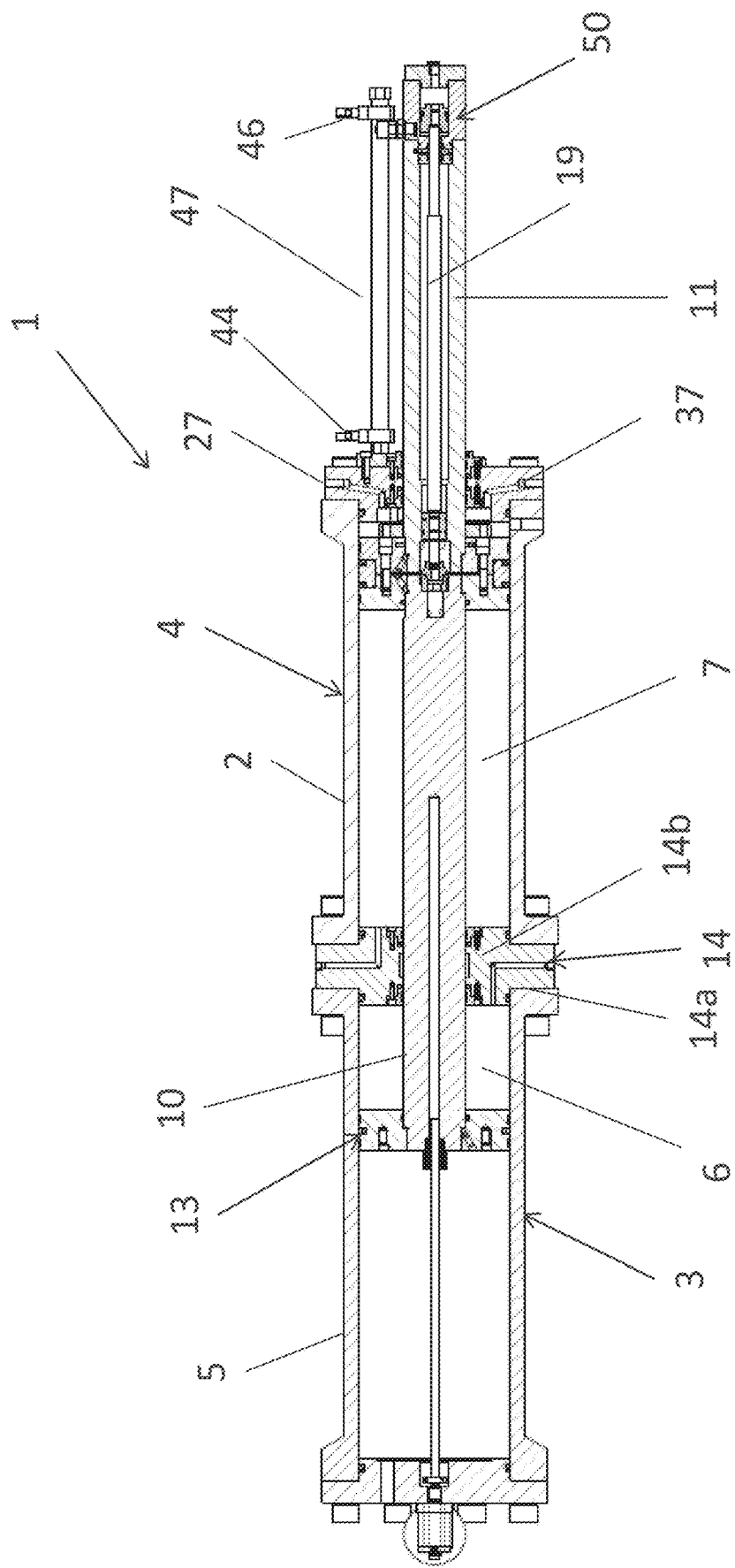
FIG. 7 shows a total longitudinal schematic section view of the apparatus according to the invention.
Figure 8:
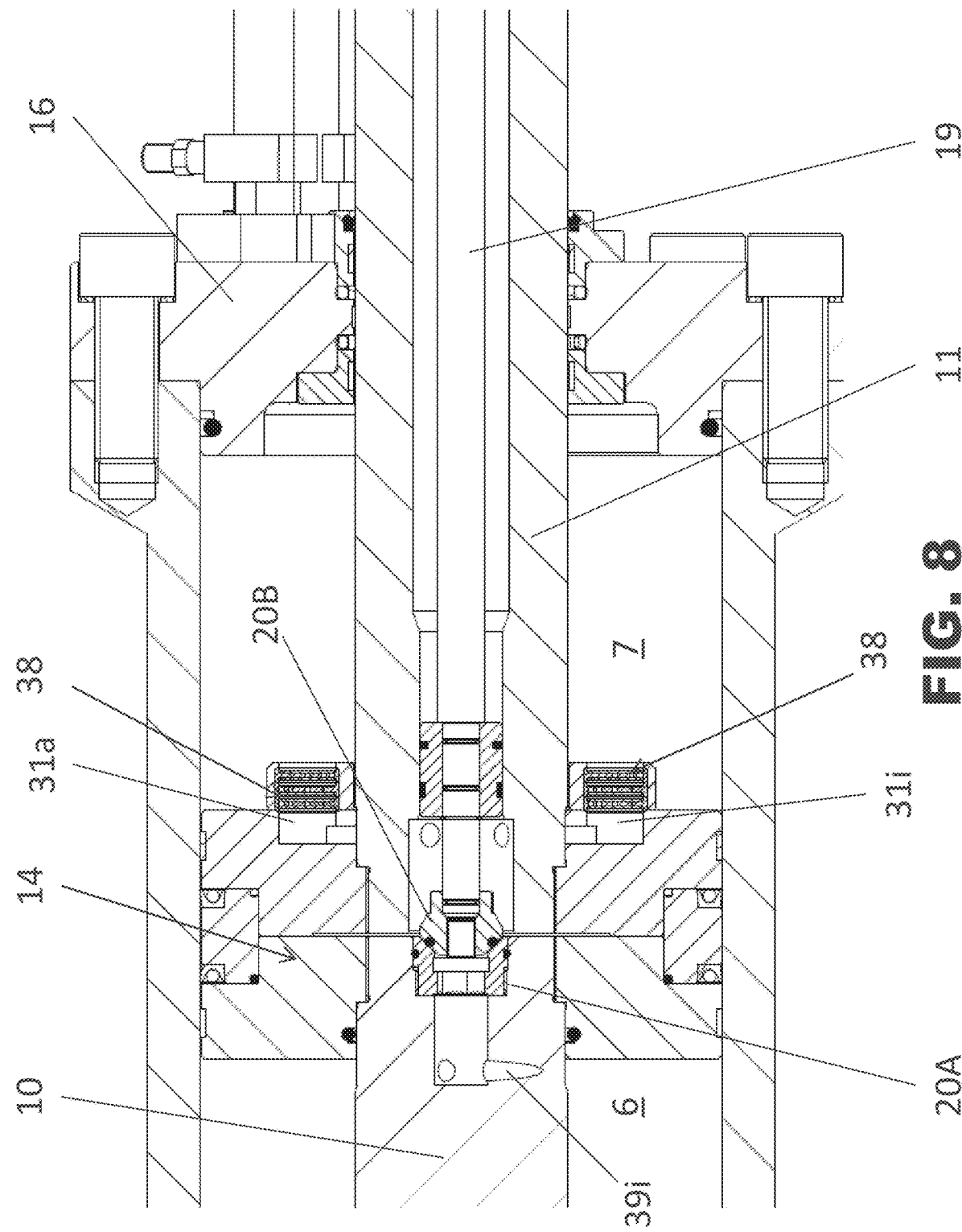
FIG. 8 shows an enlargened scale schematic view of a section detail of the apparatus of FIG. 7.

The openings 31a, . . . , 31n are preferably cylindrical housings in which the cartridges 38 are inserted, as is well shown in FIG. 6.

The cartridges 38 on the pouring path as a whole constitute a static mixer that has the assignment of intimately mixing resin and gas when these components pass through each of the several holes of the pierced plates 18. The high pressure at which the mixing takes place inside the chambers 6 and 7 of the cylinder 4 which the head 14 passes through with open circulation conduits provokes an effective dissolution and absorption of the two components of the chemical reaction.

The passages 31a, . . . 31n are in fluid communication between themselves and with the inside of the chamber 7 by means of a first pouring passage 36 transversally extended towards the axis of cylinder 4 with a central channel obtained on the inside of the semihead 14b of the head 14 at the attachment of the rod 11.

Analogously, a channel segment 41 is obtained centrally in the part of the semihead 14a of the head 14 facing the rod attachment 10. The aforementioned channel segment 41 is in communication with the channel 32 mentioned above with interposition of valve means 20A, 20B.

A second series of further pouring passages 39a, . . . , 39n is provided for in order to put the channel segment 41 into fluid communication with chamber 6 of dispersion and mixing cylinder 4. The aforementioned second series of pouring passages 39a, . . . 39n is extended radially towards the axis of cylinder 4 at the rod 10 attachment. The aforementioned passages may be twelve for example.

The valve means comprising a compass 20A and a mechanically commanded head 20B allow to hermetically close or open the access to the first pouring passage 36 and therefore to pouring passages 31a, . . . 31n. Substantially, the two valve components 20A, 20B allow to put in communication the section of chamber 6 and the section of chamber 7 of the dispersion and mixing cylinder 4 or to hermetically separate the two chamber sections in a controlled manner.

Rod 11 is internally equipped with a shaft shaped hydraulic command 19 which commands opening and closing of said valve means 20A, 20B. The shaft 19 is internally extended towards the rod 11 in a central channel and is guided in a slidable manner towards valve means by a guide 41 which is well visible in FIGS. 4 to 6.

Shaft 19 is commanded by a hydraulic head 50 located at the external far end of rod 11.

Rod 11 is slideable from a first position in which it is totally cantilever extended outside of dispersion and mixing cylinder 4, over the shutting flange 16, to a second position in which the slideable head 14 inside the same cylinder is deployed and hit towards a back wall of the coupling 35 with the hydraulic cylinder 3.

The excursion between the first and second position is detected by respective motion end sensors 44, 46 fixed onto a shaft 47 cantilever extended starting from the flange 16 parallel to the axis of cylinder 4 and to rod 11.

It is further to be noted that inside the flange 16 an entrance 37 for reactive resin, i.e. polyol, is obtained and a further entrance 27 for gas input, i.e. $CO_2$.

When the valve means 20A, 20B are controlled during opening, as is shown in FIG. 4, the alternate sliding movement of head 14, which divides the sections 6 and 7, causes the pouring of the resin contained in the two chamber sections 6,7 by means of static mixers formed by the pouring passages 31$i$, 36, 32, 39$n$. In other words, the opening of valve means 20A, 20B allows to pour while mixing through the passages 31$i$, 36, 32, 39$n$ the mixture comprising reactive resin and expansion gas.

Moving each piston 13, 14 alternatively until the respective limits, a very effective and intimate mixing of resin with gas is performed, maintaining the mixture under pressure.

When the valve means 20A, 20B in the head 14 are closed, the two sections 6 $e$ 7 of the mixing and dosing cylinder 4 alternatively become filling and dosing chambers according to the direction of piston movement.

Substantially, intimate mixing of the two components of the reaction occurs in cylinder 4 both on account of the effect of the high pressure and because of the structural conformation of passages 31$i$, 36, 32, 39$n$ on the fluid path made in head 14.

The chambers 6 and 7 which are in fluid communication by means of input/output holes of the passages 31$i$, 36, 32, 39$n$ obtained in head 14 when the valve components 20A, 20B are open.

By means of further passages obtained in the flanges 35 and 16 the two chambers 6, 7 are connected to the tubes of the resin and gas insertion/charging systems as well as to the dosing tubes headed towards a mixing and recircling head 49 from the mixing head, visible in FIG. 9.

On each of the connecting tubes to the insertion inputs 37 and 27 for resin and expansion gas on-off valves 52, 53 are installed, which open up the charging flows under pressure and in the desired resin and gas ratio.

Now referring to the scheme of FIG. 9, the modalities and hydraulic control cylinder 3 control phases will be described.

The two sections of the hydraulic control cylinder 3 are connected by means of the servo valves 25 and 26 to the hydraulic center 55 which dispenses hydraulic fluid, in particular pressured oil.

A fluid adduction/discharge passage 21 connected to an insertion opening to the upper chamber of the hydraulic cylinder 3 and an adduction/discharge passage 23 connected to a discharge opening 24 of the lower chamber of the same cylinder 3 are provided for.

On the adduction/discharge passage 21 of the hydraulic cylinder 3 a servovalve 25 is installed that can control the insertion or the discharge of the oil in the respective chamber regulating the insertion both in range and in pressure. Analogously, a servovalve 26 inserted on the adduction/discharge passage 23 is provided for.

Each servovalve, 25 or 26 is supplied by means of a hydraulic center 55 and the two servo valves are dependent on a command and control panel 30 which also controls the activation sequences of the charging and mixing valves as well as the mixing head 49, the dosing system of the isocyanate and receives and elaborates the signals from the various sensors and transducers installed on the system.

The alternate sliding movement of the piston 34 and the relative mixing head 14 is controlled in a closed loop. Now referring to the scheme of FIG. 9, the command and control panel 30 commands the servo valves 25 and 26 in order to supply the chambers of the control cylinder 3 in an alternate fashion by controlling their movement according to a closed loop by means of the position transducer 45 inserted into the rod 33 of the piston of the same hydraulic cylinder 3. Alternatively, controlling occurs in a closed pressure loop according to three modalities:

A) during resin and gas charging in order to maintain the two components of the of the blend reactive resin and gas under pressure during the charging of mixing and dispersion cylinder 4 by means of pressure transducers installed at the end of or on top of the servo valves;

B) during the dispersion cycle of the gas in the resin, by means of pressure transducers installed at the end or on top of the servo valves;

C) during the first compression phase, before the dosage towards the high pressured mixing head 49, by means of the pressure transducer inserted on the connection the send tubes 48 towards the mixing head in a closed pressure loop.

It is good to underline that the recirculation of resin with the dispersed gas may also occur through a valve element (indicated as mixing distributor) installed in the high pressured mixing head 49 and destined to recirculate the two reactive resins before they are mixed in stechiometric ratio. This recirculation allows to precisely set the ranges in a stechiometric ratio before retracting the valve element and allowing their mixture by means of turbolence introduced by high pressure.

This two servovalve system 25, 26 allows to stabilize command with different command modes: e.g. it is possible to command the sliding of the hydraulic dispersion cylinder 3 under controlled pressure by adjusting the affluence of the command oil by means of the servovalve 25 and simply opposing a certain hydraulic contrast pressure on the command chamber associated with the servovalve 26. Analogously it is possible to command the hydraulic cylinder 3 in the opposite direction controlling the sliding thereof in returning oil range by means of the servovalve 26 and opposing by adjusting the effluence of the oil in the chamber that contrasts it by means of the servovalve 25.

This operating mode is particularly advantageous for controlling and contrasting the elastic reaction pressure of the gas dispersed in the resin due to the compressibility thereof, i.e. that $CO_2$, even when dispersed under pressure, determines an elastic type of reaction to the movements commanded by piston 3 and therefore tends to establish an oscillatory type of disturbance to the command system of the movement in a closed range adjustment loop and when operating in pressure dosage of the mixture or blend of resin and gas.

Now referring to the scheme of FIG. 9, the control phase of the resin and gas filling and their dispersion under pressure by means of the command and control of the hydraulic cylinder 3 will be described.

In a preliminary phase of the process according to the present invention it is necessary to preventively perform filling of the mixture components resin and gas furthermore guaranteeing maintenance in high pressure thereof during charging, mixing and dosing. Even the process temperature is adequately controlled so as to maintain the $CO_2$ in supercritical conditions.

For the filling phase of chamber 7 of the mixing/dosing cylinder 4 one operates with the following sequence:

Two openings indicated by numbers 37 and 27 in FIG. 2 are obtained in the lower shutting flange 16 of the mixing and dosing cylinder 4.

A first opening 37 serves as an input for the non-mixed resin, e.g. polyol, and is equipped with an on-off interception valve 53.

A second opening 27 for gas input, e.g. compressed $CO_2$, is equipped with an on-off interception valve 52.

A third opening 48 may serve as an exit towards the mixing head 49, according to the phases of the process, for the mixture or blend of mixed resin. This opening 48 is also equipped with an interception on off valve indicated with the number 56.

On the opposite side of flange 16 of the blender cylinder 4, in communication with the other chamber 6, a further opening 50 is obtained for recircling the mixed resin from the mixing head 49 and for expelling the resin that is to be replaced through a draining valve 54.

The process according to the invention first of all provides for an emptying phase of chamber 7 of the mixing and dosing cylinder 4. This phase is also called reset.

The two insertion valves 53, 52 associated to the inputs 37, 27 of the reactive resin (polyol) and the expansion gas ($CO_2$) are contemporarily closed; in the meantime a valve 56 associated with the third opening 48 of the dosing cylinder 48 as well as the draining valve 54 associated with the further opening 50 are opened.

The piston of the dosing cylinder 4 is closed and sealed upon pouring, activating the valve means 20A and 20B in closure, and is sent to the limit by push towards the lower flange 16 thus expelling the residual mixed resin through the exit 50 and the draining valve 54.

At this point the process may proceed with a filling phase of chamber 7 in order to perform the formation of the resin-gas blend.

The servo valves 25 and 26 are adjusted in pressure control so as to generate a precharge force of the piston 14 which corresponds to the dispersion set pressure (usually around 100 bar). The amount of calibrated resin (polyol) is therefore inserted by means of a dosing unit (measured in mass), required to obtain the desired blend taking the total available volume into account.

These measurements are handled by the command and control panel 30 which supervises the entire operation of apparatus 1.

During this filling phase, the hydraulic control cylinder 3 stops in pressure control by means of the servovalve 25 which partializes the outpour of the hydraulic oil in order to maintain a pressure of about 100 bar in the chamber 7 that is filled. The minimal pressure at which $CO_2$ dispersion may start is of 75-76 bar, but preferably 100 bar are reached.

When the expected and predetermined amount of reactive resin (polyol) is therefore inserted, the relative insertion valve 53 associated with input 37 is closed.

The new valve 52 associated with the gas adduction input 27 is then opened and $CO_2$ is inserted still imposing a pressure of at least 100 bar that maintains analogous density conditions, both in liquid conditions, and in supercritical gas conditions, and the process proceeds with the adduction of gas up until the amount (measured in mass) that is required to obtain the desired mixture.

The valve 52 associated with the input 27 for gas insertion is then closed and the process proceeds with small adjustments of resin and gas adduction in the desired ratio until reaching the limit of the piston of the mixing and dosing cylinder 4, still maintaining at least 100 bar in braking of the control piston 3.

If the dosing unit of the reactive resin (polyol) and the $CO_2$ are synchronized in a mass range ratio one can operate the contemporary charging of both blend components maintaining the chamber under controlled pressure.

The process continues with a dispersion, mixing and absorption phase of the resin and the gas at high efficiency by means of closing the valves 56 that connect to mixing head 49 and the insertion valves 53, 52 and the alternate sliding movement of the head 14 once the valve 20A and 20B has been opened by means of the rod 19.

This way pouring of the mixture by means of static mixers 38 inserted in the passages 31i between one chamber 7 and the other 6 is used to disperse and mix.

Both the opening of the valve means 20A and 20B, and the gas absorption phase on behalf of the resin, cause an increase of the available volume for the gas phase and a resulting reduction of pressure inside the two chambers 6 and 7.

For the resin and gas mixing phase, the control cylinder 3 is controlled with pressure control on the chamber that moves control piston 33 but also imposing a certain counterpressure (which can vary from 10 to 40%) by means of the valve that opposes itself to movement in pressure control to stabilize movement by means of a closed pressure circuit with feedback from pressure transducers mounted on sending passages of the servo valves 25, 26.

The piston 34 of the mixing and dosing cylinder 4 is alternatively moved forwards and backwards by the hydraulic cylinder 3 so as to rapidly homogenize dispersion and mixing of gas in the resin.

The passage into solution is monitored by means of pressure reduction in chambers 6 and 7 which signals $CO_2$ absorption into solution the polyol and also a part of passage into solution of polyol into $CO_2$.

When the pressure reduction exceeds a settable threshold, the control system restores pressure by means of further resin and gas insertion in small amounts until the pressure in chamber 7 is restored and also increased until about 240 bar.

After a necessary, but relatively brief time, in order for the mixture to pass completely through the static mixers 38 of the head 14, the process is stopped and a possible further diffusion or absorption of $CO_2$ at a molecular level in the resin-gas blend is expected.

Advantageously, the solubility of supercritical $CO_2$ dispersed at a molecular level slows down $CO_2$ expression into the forming foam. The emission and release of physical $CO_2$ does not occur in an almost instantaneous and violent way as occurs when $CO_2$ is dispersed in low/average pressure conditions, as in the known art, but occurs in a longer release time which lasts from one to around ten seconds as a function of the polymer's viscosity.

The formation of $CO_2$ that is liberated from molecular dispersion may be further modulated, e.g., by means of pressure control conditions in the mold, therefore originating a foam with very small cell sizes and exempt from expansion agents that are harmful for the environment.

During the described operations it is also possible to heat the blend in order to bring it to surely supercritical conditions.

A safety valve, installed at the input/output 56 of the blend, provides a guarantee to not overstep the project pressure limit in cylinder 4.

The process according to the invention now proceeds towards the conclusive phases that provide dosage and mixing of the resin-gas mixture thus obtained with other reactive resin (e.g. isocyanate) for the formation of polyurethane foam.

When the blend has reached the desired absorption point (signaled by stabilization of pressure reduction), and is maintained at the set temperature and pressure, the chemical system is ready for the dosage towards the mixing head.

Now the mixing head 49 of the polyurethane foam forming system and the mixing phase by means of turbolence induced by jets generated at high pressure will be described.

The high pressure mixing heads 49 use kinetic energy and turbolence induced by the collision of two highly energetic jets to intimately mix the reagent resins.

They are composed of:

a cylindrical mixing chamber which is faced by two or more injectors that are opposed or anyway direct their jets on a firing point.

A valve element or cylindrical distributor hydraulically commanded and provided with longitudinal recirculation cavities or grooves which do not communicate.

Rear passages for resin recirculation that face the mixing chamber in longitudinal correspondence with the injectors.

When the distributor is advanced, the cavities face the injectors. The resins pass through the injectors which maintain the dosage pressure thereof upline and generate high kinetic energy jets that enter the cavities from which they are sent back into recirculation towards the origin tanks.

Upon moving the distributor into a withdrawn opening position, the injectors are uncovered and the resin jets come in to high speed collision in the firing point, developing the necessary turbolence for their basically instantaneous mixture.

The heads may also have a deflux chamber located at 90° degrees relative to the mixing chamber where a closing and opening organ slides which provides the expulsion of the reactive resin when the high pressure mixing process is completed.

The resin-gas blend comprising polyol with dispersed gas ($CO_2$) will now be described.

Still referring to the scheme of FIG. 9, the command phase of the hydraulic cylinder 3 for the control of recircling and mixing with the other reactive resin, isocyanate in particular, will now be described.

The control modalities of the formation process of the polyurethane foam provide for a control loop by means of range and pressure transducers installed on circuit 28 in a closed range loop with range transducer 57 feedback.

Both the input/output of chamber 7 of the mixing and dosing cylinder 4 and of chamber 6 are connected to the supply and recircling circuit of a high pressure mixing head 49 by means of a supply passage 58 and a recircling passage 60.

For this operation modality the command panel 30 provides for bringing the head 14 to the end limit against the upper flange 35 a pouring condition and then hermetically closing the pouring valve means 20A, 20B.

An increase is therefore activated, controlled by the resin with CO2 pressure in a closed pressure ring prior to opening on off valve 56 installed on the line 58. Since experimental trials have proven that the blend is compressible, it is appropriate to bring the entire chamber 7 to an elevated work pressure (e.g. 160 or 180 bar) prior to the dosage phase operating with pressure control.

At this point the dosage control is switched into range control with feedback by means of the transducer 57 installed on the supply line 58 to the mixing head 49. This way the outlet valve 56 may be opened and the control piston may be commanded in closed blend range loop by means of the servo valve to dose, by measuring the mass range and adjusting by feedback, the blend towards the mixing head 49 where the pressure is adjusted by the injector installed here.

The precise dosage is adjusted by means of the servovalve 25 that adjusts the resin range by inserting oil in a controlled manner into the upper thrust chamber of cylinder 3 while the servovalve 26 maintains a counterthrust pressure in order to stabilize piston movement in presence of the elastic reaction of the gas dispersed in resin.

In a first dosage phase the resin with the dispersed gas, as the first reactive component, recirculates towards chamber 6 through a valve element 61, referred to as mixing distributor, installed in the high pressure mixing head 49 and destined to recirculate the two reagent resins before mixing in a stoichiometric ratio. This re-circulation allows to precisely set the ranges in a stoichiometric ratio before withdrawing the valve element 61 and allowing the mixing by turbolence induced from high pressure. The system will reach the set pressure by means of the injector setting and the set range by means of the blender range controller, while the distributor 61 of the mixing head 41 in an advanced position provides the blend recirculation towards the upper chamber 6 of the blender cylinder 4.

The final isocyanate dosage phase will now be described.

The isocyanate dosage in stoichiometric ratio, as the second reactive component, is also managed by the control panel 30 controlling the range with the known modalities. The isocyanate (reactive resin) dosage is performed by a dosage module of a volumetric pump and a mass range transducer and controlled in a closed range loop.

The isocyanate dosage module also brings the isocyanate to the set pressure by means of adjusting the isocyanate injector and to the controlled range by means of the isocyanate dosage module.

Analogously to polyol, the isocyanate is recirculated towards the respective tank by means of the respective cavity of the closed distributor in an advanced position.

When both dosages are in set phase, the control system of the head commands the opening in a withdrawn position of the distributor while the self-cleaner was already in an open condition (the self-cleaner is a component of L-shaped high-pressure heads)

This way the blend is intimately mixed with isocyanate and the reagent mixture may flow into a mold that can have been kept in pressure conditions by means of, e.g., nitrogen or compressed air pressure adjustment.

The reactive resin may free CO2 in gas shape which is no longer in the prior balance conditions of when dispersed under pressure within the resin.

The solubility of supercritical CO2 dispersed in the prior condition will slow down CO2 expression into the forming foam, an emission that does not occur in an almost instantaneous and violent way as when CO2 is dispersed in low/average pressure conditions but which takes place with longer release time, e.g. modulated by a pressure control condition in the mold, thus originating a foam with very small cell sizes and exempt of expansion agents that are harmful for the environment.

What is claimed is:

1. Apparatus suitable for the dispersion and mixing of an expansion gas in a reactive resin, comprising:
    a mixing chamber having a supply input for the gas and a supply input for the resin;
    said chamber being a dispersion and containment chamber made in a casing with external walls having an enhanced thickness susceptible to sustain high pressure;
    said chamber being divided into two sections by a head of a dispersion and mixing cylinder-piston group, one section of said chamber receiving said supply inputs said two sections being further in fluid communication between themselves by at least one pouring passage;
    a static mixer in said pouring passage;

a motor for said piston to control the movement of said mixing cylinder-piston group;

wherein the dispersion and mixing cylinder-piston group comprises a piston rod connected to said head and cantilever extended outside of the cylinder through a shutting flange, and wherein the apparatus further comprises a valve for mechanically controlled interception alongside said pouring passage; a command shaft controlling said valve being housed in a groove obtained inside said cantilever extended outside of said cylinder.

2. Apparatus for the dispersion and mixing of a gas according to claim 1, wherein said pouring passage intercepted by valve is realized into said head in order to put the two sections of the dispersion and containment chamber under pressure into communication and in that said supply inputs for gas and resin flow into a section of said chamber.

3. Apparatus for the dispersion and mixing of a gas according to claim 1, wherein said expansion gas is carbon dioxide maintained in supercritical temperature and pressure conditions.

4. Apparatus for the dispersion and mixing of a gas according to claim 1, wherein said casing of predetermined high resistance is formed by the containment walls of at least said dispersion and mixing g cylinder-piston group.

5. Apparatus for the dispersion and mixing of a gas according to claim 1, wherein said high pressures vary from at least 75 bar to 350 bar.

6. Apparatus for the dispersion and mixing of a gas according to claim 1, wherein said at least one pouring passage is realized into the head of said cylinder-piston group and comprises at least one cylindric housing wherein said static mixer is inserted as a cartridge and comprises at least one grid or plate with a plurality of holes.

7. The apparatus for the dispersion and mixing of a gas according to claim 1, wherein said motor includes an oleodynamic commanding cylinder, powered by an oleodynamic circuit dependent on a hydraulic unit controlled by a programmable controller; said oleodynamic commanding control cylinder having a piston with a rod in common with the piston rod of the dispersion and mixing cylinder-piston group.

8. The apparatus for the dispersion and mixing of a gas according to claim 7, wherein it comprises a position transducer associated with the piston of the control cylinder to send a feedback signal to said hydraulic unit controlled by the programmable controller.

9. System for the formation of a polyurethane foam starting from a first reactive component comprising an intermediate resin-gas mixture and at least one second reactive component comprising a reactive resin wherein said intermediate resin-gas mixture is obtained in an apparatus according to claim 1.

10. System according to claim 9 wherein the expansion gas of said intermediate resin-gas mixture is carbon dioxide kept in supercritical temperature and pressure conditions.

11. System according to claim 9 further comprising a flow and pressure transducer installed on a circuit in a closed flow loop feedback by a flow transducer.

12. System according to claim 11 wherein in a first dosing phase of the first reactive component a re-circling is provided towards a section of the cylinder-piston mixing group, in order to precisely set the flows in a stoichiometric ratio, by a valve member or mixing distributor installed in a mixing head.

* * * * *